(12) United States Patent
Valentine et al.

(10) Patent No.: US 9,164,166 B1
(45) Date of Patent: Oct. 20, 2015

(54) DISPLAY OF RADAR SIGNAL DETECTION ALERTS

(71) Applicants: Michael D. Valentine, Cincinnati, OH (US); Gary E. Carrelli, Cincinnati, OH (US); Richard L. Dickerson, Union, KY (US); Michael Negussu, Cincinnati, OH (US); Stephen R. Scholl, Cincinnati, OH (US)

(72) Inventors: Michael D. Valentine, Cincinnati, OH (US); Gary E. Carrelli, Cincinnati, OH (US); Richard L. Dickerson, Union, KY (US); Michael Negussu, Cincinnati, OH (US); Stephen R. Scholl, Cincinnati, OH (US)

(73) Assignee: Valentine Research, Inc., Cincinnati, OH (US)

( * ) Notice: Subject to any disclaimer, the term of this patent is extended or adjusted under 35 U.S.C. 154(b) by 275 days.

(21) Appl. No.: 13/796,283

(22) Filed: Mar. 12, 2013

Related U.S. Application Data

(63) Continuation-in-part of application No. 13/571,636, filed on Aug. 10, 2012.

(51) Int. Cl.
*G01S 7/04* (2006.01)
*G01S 7/02* (2006.01)

(52) U.S. Cl.
CPC .................................. *G01S 7/022* (2013.01)

(58) Field of Classification Search
CPC ......... G01S 7/022; G01S 7/04; G01S 7/4806; G01S 19/42; G08G 1/09675
USPC ....................................... 342/7, 89, 105, 176
See application file for complete search history.

(56) References Cited

U.S. PATENT DOCUMENTS 7,450,051 B1 * 11/2008 Valentine et al. ................. 342/2

* cited by examiner

*Primary Examiner* — Timothy A Brainard
(74) *Attorney, Agent, or Firm* — Stevens & Showalter, LLP

(57) ABSTRACT

A device includes a radar signal detector configured to detect a police radar signal and determine a frequency of the police radar signal and a display in communication with the radar signal detector and configured to provide a first display portion associated with a first range of frequencies. In particular, the display is further configured to provide a visual indicator associated with the police radar signal, the visual indicator having a first position within the first display portion which varies based on the frequency of the police radar signal and the visual indicator having a first visual appearance when the frequency is within a predetermined subset of the first range of frequencies and a second visual appearance when the frequency is outside the predetermined subset of the first range of frequencies.

23 Claims, 13 Drawing Sheets

DISPLAY OF RADAR SIGNAL DETECTION ALERTS

FIELD OF THE INVENTION

The present invention relates generally to police radar detectors used in motor vehicles and, more particularly, to compactly displaying information about detected radar signals.

BACKGROUND

Radar signals have been commonly used by police for some time to determine the speed of motor vehicles. In response to radar speed monitoring and to signal motor vehicle operators when such monitoring is taking place, police radar detectors have likewise been used for almost a coincident period of time. Currently available radar detectors indicate the presence of radar signals, the frequency band of detected signals, the direction from which the radar signals originate and the relative field strength of detected signals. In addition, the current radar detectors can also display information about their current mode of operation and the number of detected radar signals at any given time. The widely varying operating procedures for using police radar and the proliferation of other signals assigned to the same frequency bands as police radar has led to the need for police radar detectors which give more information than has been contemplated in the past.

For example, police radar units are often deployed along the side of the roadway, to measure a motor vehicle's speed as it advances toward the unit. In some instances, the police radar may measure the speed of a motor vehicle after it has passed and is travelling away from the unit. Police vehicles may also be equipped with radar units which are operated while the police vehicles are moving, using reflections from stationary objects to measure the speed of the police vehicle itself, and reflections from a target vehicle to measure relative speed, and using both measured speeds to determine the actual speed of the target vehicle.

When a vehicle equipped with a radar detector is within microwave range of a police radar unit which transmits a radar signal, the detector alerts the vehicle operator that the signal is present typically through a combination of audible and visual signals. As the user approaches the source of the radar signal, signal strength of the detected radar signal typically increases. As the vehicle passes the source of the radar signal, the indicated signal strength drops, usually very quickly, since a forwardly aimed directional antenna of the detector is no longer pointed in the general direction of the signal source, and is now responding to reflections of the signal from objects in front of the vehicle. If the police radar unit is at the side of the road in a clearly visible location, the vehicle operator can easily correlate the detected signal and its apparent source.

Often, a driver using a radar detector may be travelling at a relatively high rate of speed and would benefit from receiving all the available information about a detected radar signal as quickly and concisely as possible. Thus, there remains a need for police radar detectors that efficiently and effectively convey as much information to a driver as easily and quickly as possible.

SUMMARY

Accordingly, aspects of the present invention relates to a device that includes a radar signal detector configured to detect a police radar signal and determine a frequency of the police radar signal and a display in communication with the radar signal detector and configured to provide a first display portion associated with a first range of frequencies. In particular, the display is further configured to provide a visual indicator associated with the police radar signal, the visual indicator having a first position within the first display portion which varies based on the frequency of the police radar signal and the visual indicator having a first visual appearance when the frequency is within a predetermined subset of the first range of frequencies and a second visual appearance when the frequency is outside the predetermined subset of the first range of frequencies.

Another aspect of the present invention relates to a method for displaying information about a detected radar signal that includes determining a frequency of the detected radar signal and displaying a first display portion associated with a first range of frequencies. The method additionally includes displaying a visual indicator associated with the police radar signal, the visual indicator having a first position within the first display portion which varies based on the frequency of the police radar signal and the visual indicator having a first visual appearance when the frequency is within a predetermined subset of the first range of frequencies and a second visual appearance when the frequency is outside the predetermined subset of the first range of frequencies.

BRIEF DESCRIPTION OF THE DRAWINGS

While the specification concludes with claims particularly pointing out and distinctly claiming the present invention, it is believed that the present invention will be better understood from the following description in conjunction with the accompanying Figures, in which like reference numerals identify like elements, and wherein:

DETAILED DESCRIPTION

In the following detailed description of the preferred embodiment, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of the present invention.

As previously noted, aspects of the present invention relate to a motor vehicle radar detector which not only detects the presence of radar signals incident on a motor vehicle, but also determines a signal strength associated with those detected signals and determines a direction of a source of the radar signals. Furthermore, such a radar detector provides a display that alerts the operator of the motor vehicle of both the source direction or angular orientation of the radar signal source relative to the motor vehicle and the strength of the detected signal. When the radar detector is aligned substantially in the same direction as the motor vehicle, the direction of the source relative to the detector is the same as that relative to the motor vehicle (e.g., in front of, to the rear of, to the side of, etc.).

An exemplary radar detector capable of detecting radar signal strength and the direction of the radar signal source is fully described in U.S. Pat. No. 5,083,129, which is assigned to the same assignee as the present application and is incorporated herein by reference in its entirety. Also, a multi-band radar detector capable of determining a relative direction of a radar source is more fully described in U.S. Pat. No. 7,450,051, which is assigned to the same assignee as the present application and is incorporated by reference herein in its entirety.

Figure 1:
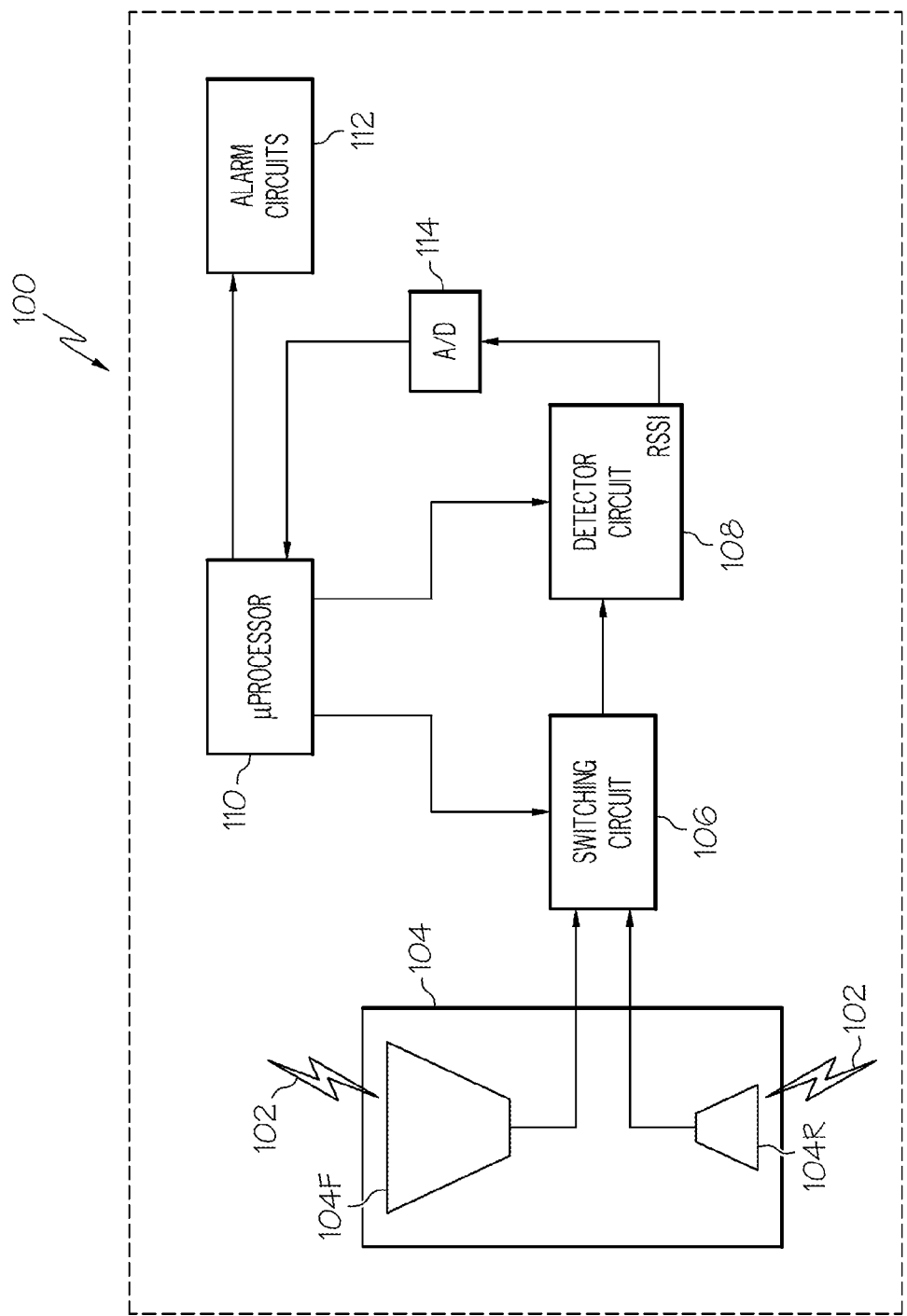
FIG. 1 provides a high-level functional block diagram of a police radar detector.

FIG. 1 provides a high-level functional block diagram of a police radar detector similar to those described in the above-referenced, and incorporated, patents. The radar detector 100 of FIG. 1 monitors one or more police radar bands to sense radar signals 102 incident upon a receiver that comprises antennas 104 (e.g., a generally forwardly directed antenna 104F and a generally rearwardly directed antenna 104R). While the antennas 104F, 104R are illustrated as generally facing the front and the rear of a vehicle that includes the detector 100, it is to be understood that the antenna directions can be different for given applications and as a result of existing or future requirements. Signals received by the antennas 104F, 104R are passed to a switching circuit 106. The switching circuit 16 can connect signals from the antennas 104F, 104R to a detector circuit 108 which can generate radar identification signals identifying incoming radar signals. The detector circuit 108 can differentiate between likely police radar signals and nuisance radar signals emanating from other radar sources.

In FIG. 1, the detector circuit 108 comprises any appropriate radar detector circuit 108 capable of generating a received signal strength indicator (RSSI) output signal which indicates the signal strength of radar signals detected by the detector circuit 108. The RSSI output signal can be digitized using an analog-to-digital converter 114 before being communicated to a microprocessor 110. The switching circuit 106 and radar detector circuit 108 can take a wide variety of forms and can include amplifiers, mixers, diplexers, and other circuitry commonly used in the radar detector field as are well known to those skilled in the art.

A microprocessor 110, or similar processing device, controls the switching circuit 106 to selectively connect signals from the antennas 104F and 104R to the detector circuit 108. Operation and control of the detector circuit 108, for example for the detection of radar signals in different frequency bands allocated to police radar signals, are also performed by the microprocessor 110. The microprocessor 110 additionally controls alarm circuits 112 to communicate information regarding detected radar signals to the operator of a motor vehicle utilizing the detector 100 by means of one or more alarm tones and/or visual indicators which are included within the alarm circuits 112 and more fully described below. In particular, the microprocessor 110 can generate control signals for the alarm circuits 112 and any visual displays.

Figure 2:
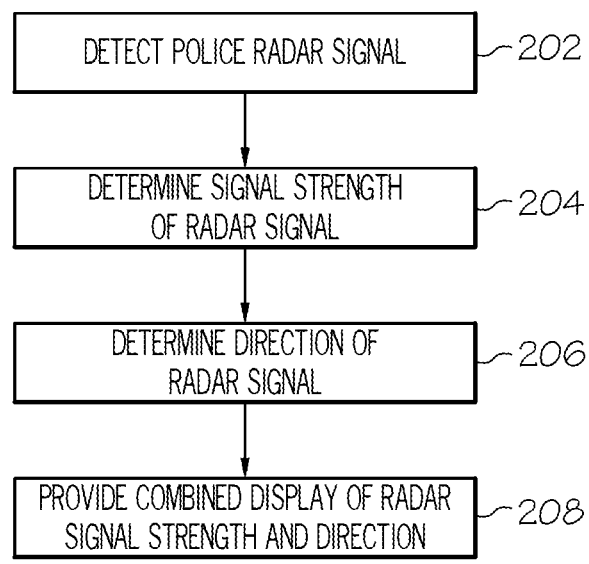
FIG. 2 depicts a flowchart of an exemplary method of displaying radar signal information in accordance with the principles of the present invention.

FIG. 2 depicts a flowchart of an exemplary method of displaying radar signal information in accordance with the principles of the present invention. In particular, a police radar detector is operated to scan a number of different bands of frequencies related to police radar sources. In step 202, the antennas, detector circuit, and signal processing circuits detect that a radar signal is present that likely corresponds to a police radar signal. The detector circuit of the police radar detector can, in step 204, determine a particular signal strength associated with the detected radar signal.

Based on the radar signal characteristics received by differently oriented antennas, the radar detector, in step 206, can also determine a direction from which the detected radar signal originated. In particular, a direction can be determined relative to a vehicle in which the radar detector is operating. For example, the direction from which the detected radar signal originated can be referred to as "from in front of the vehicle", "to the side of the vehicle", and/or "from behind the vehicle".

The microprocessor 110 of the radar detector can then generate control signals for activating the different alert and alarms circuits that inform a vehicle operator of the presence of the detected radar signal and its various attributes. In particular, the microprocessor, in step 208, can generate control signals for visual display circuits of the radar detector and provide those control signals to the display circuits.

Figure 3:
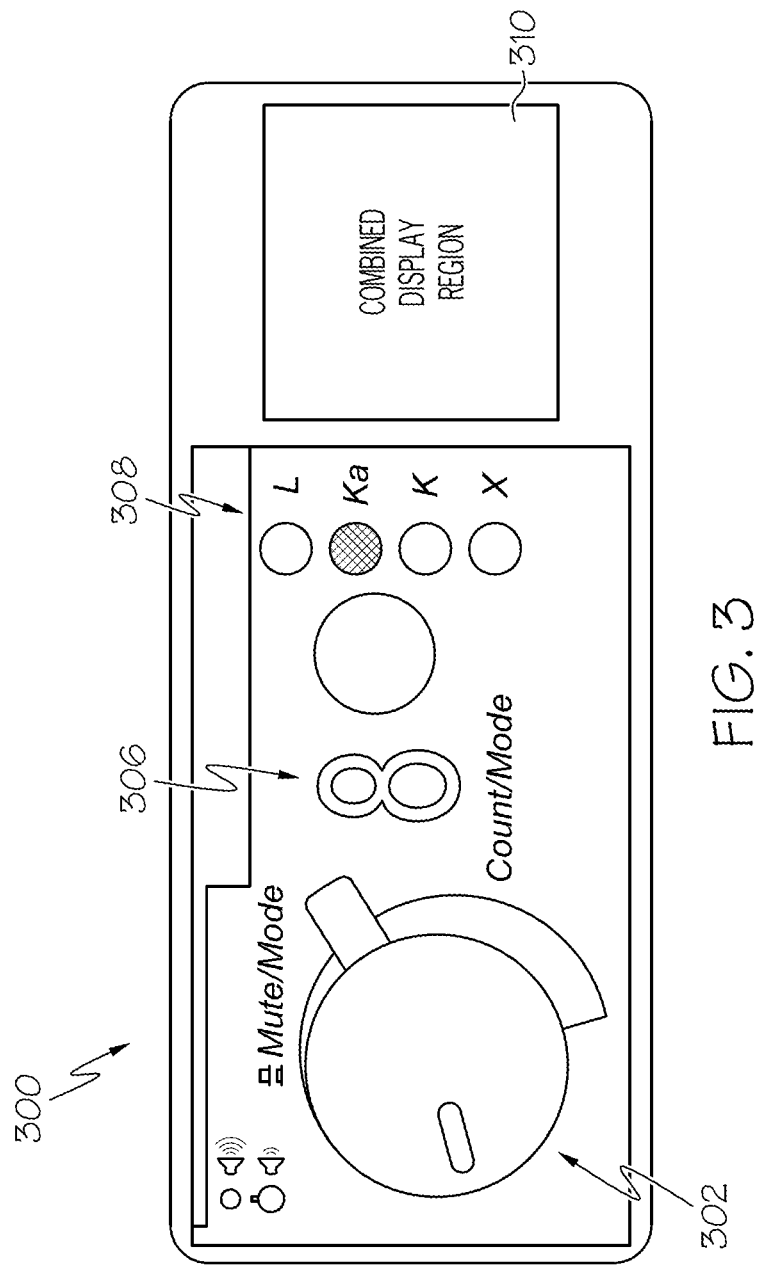
FIG. 3 depicts a view of an exemplary radar detector front panel in accordance with the principles of the present invention.

FIG. 3 depicts a view of an exemplary radar detector front panel in accordance with the principles of the present invention.

In FIG. 3, a front panel 300 of the detector 100 includes one or more user-adjustable controls 302, a count/mode indicator 306 illustrated as a 7-segment display, a band indicator 308 and a display 310 configured to provide a combined signal strength and direction indicator. Herein, the display 310 is generally referred to as a combined display region. A user, or driver, can set the user-adjustable controls 302 to user-defined preferences, e.g., to control the volume of audible alarms, to control the sensitivity of the antenna, etc. The count/mode indicator 306 can provide a count of the number of detected signals and can also provide operating mode information to the user. The band indicator 308 can provide an indication of a particular radar band of detected radar signals. The combined display region 310 provides both a visual representation of the relative strength of detected radar signals to the user and a visual indication of the direction of the detected signals. In other words, the visual appearance of the combined display region 310 varies based on both the signal strength and the direction. Thus, a single portion or region 310 of a display of the front panel 300 is configured to simultaneously provide a visual indication of both signal strength and signal or signal source direction to a user. The front panel 300 is merely illustrative and other features or manners of display may be implemented.

One of ordinary skill will recognize that embodiments of the present invention contemplate a variety of different ways to arrange a signal strength indicator and a signal direction indicator within a single visible region of a radar detector display. However, FIGS. 4A-4F are provided by way of example, and not of limitation, of how such a concurrent display can be accomplished. Thus, FIGS. 4A-4F depict concurrent display of a signal strength indicator and a signal direction indicator in accordance with the principles of the present invention. In the description below, reference is made to one or more visual indicators that are activated to provide a user with a visual indication of one or more properties related to a detected radar signal. The visual indicators can comprise multiple segments of light emitting diodes (LEDs), one or more liquid crystal display (LCD) elements, incandescent light bulbs, or pixel-based display screens similar to a computer monitor or television. The elements which comprise the display can be back-lit and/or illuminated so as to be visible in different light conditions within the vehicle.

Figure 4A:
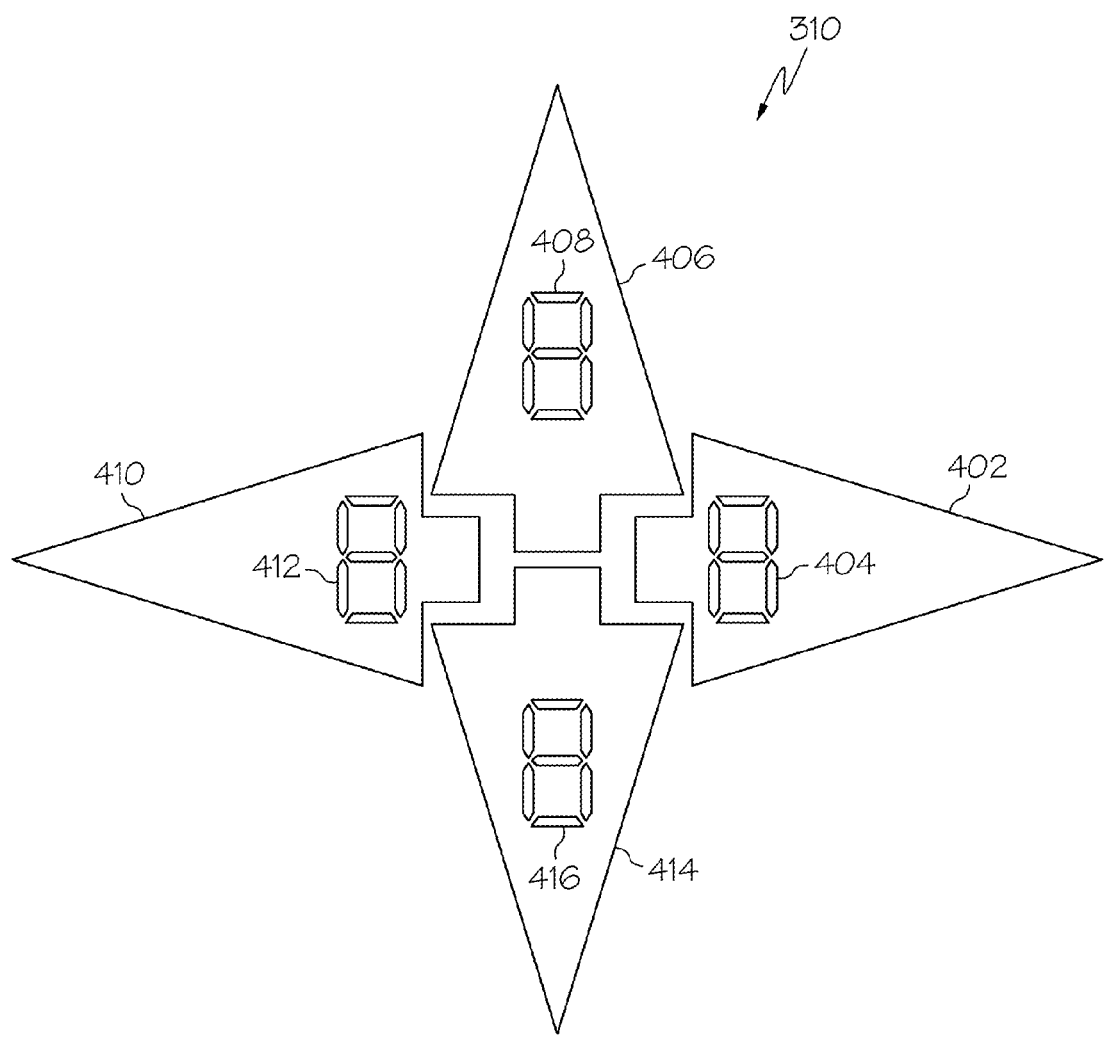
FIGS. 4A-4F depict concurrent display of a signal strength indicator and a signal source direction indicator in a single portion of a display in accordance with the principles of the present invention.

In FIG. 4A there are four directional arrows 402, 406, 410 and 414 that can be illuminated and that respectively represent source directions corresponding to the right of the radar detector, in front of the radar detector, to the left of the radar detector, and to the rear of the radar detector. Overlapping each of the four directional arrows is a respective signal strength indicator. In the example of FIG. 4A, each respective signal strength indicator can be a 7-segment display such that display 404 is associated with directional arrow 402, display 408 is associated with directional arrow 406, display 412 is associated with directional arrow 410, and display 416 is associated with directional arrow 414. The four directional arrows 402, 406, 410, and 414 as well as the four 7-segment displays 404, 408, 412, and 416 comprise the combined display region 310.

In operation, the microprocessor 100 of the radar detector 100 will determine, based on the detected radar signals, the correct control signals to activate the correct directional arrow and the correct 7-segment display. Furthermore, a value displayed by the 7-segment display will reflect a signal strength of the detected radar signal. For example, if a radar signal is detected from the rear of the radar detector and has a scaled signal strength of 4-out-of-10, then the directional arrow 414 will be illuminated and the 7-segment display 416 will become active and display the value "4".

Figure 4B:
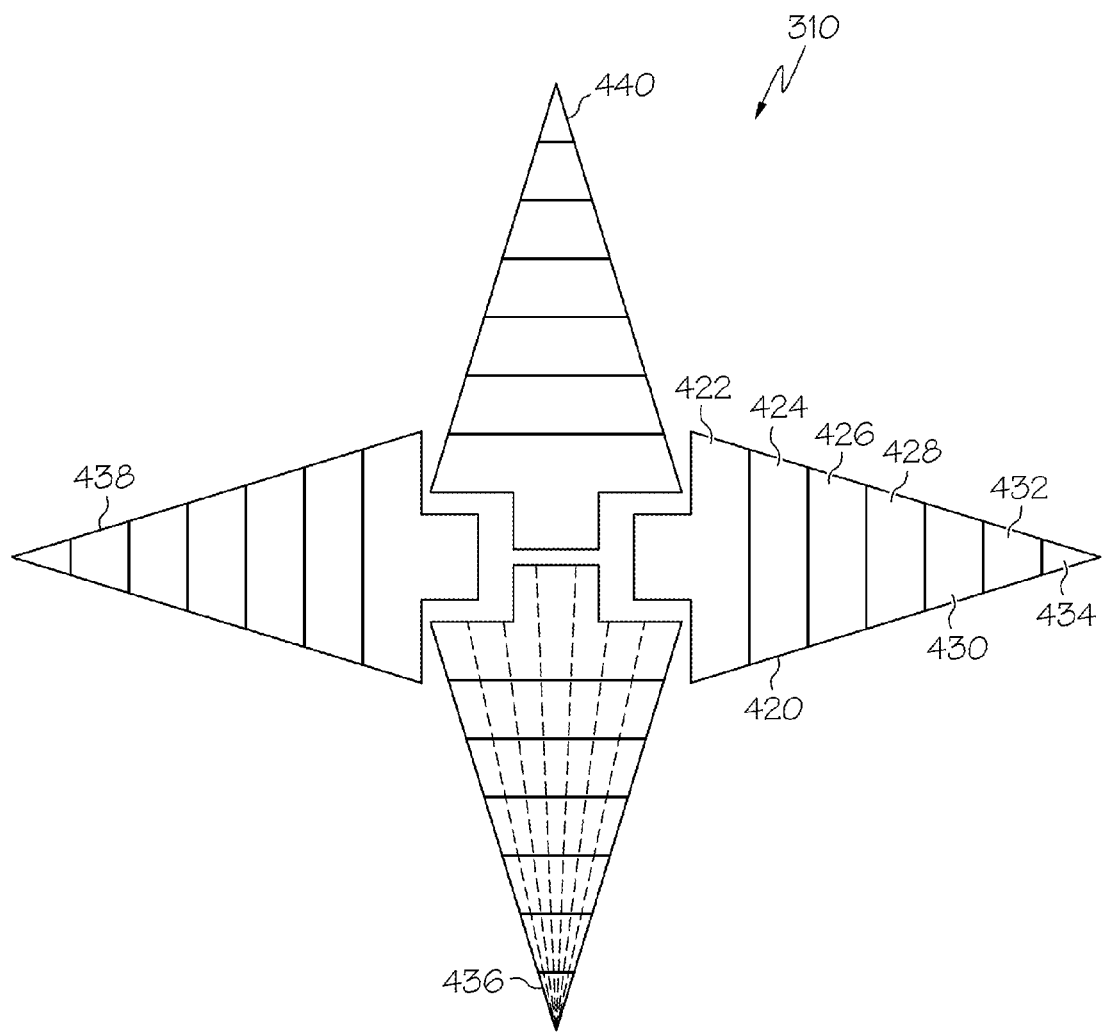

FIG. 4B depicts another combined signal strength indicator and signal direction indicator in accordance with the principles of the present invention. Similar to the combined display region of FIG. 4A, the combined display region 310 of FIG. 4B includes four directional arrows 420, 436, 438, and 440 each corresponding to a respective direction relative to the radar detector. Because all four directional arrows can operate in a substantially similar manner, only the operation of one directional arrow (e.g., arrow 420) will be described.

The directional arrow 420 is comprised of multiple segments 422-434. In the example of FIG. 4B, the number of segments happens to be 7; however, one of ordinary skill will recognize that the number of different segments can be varied without departing from the scope of the present invention. The outermost segment 434 can correspond to a first signal strength level and the adjacent segment 432 can correspond to a second signal strength level, wherein the second signal strength level is greater than the first signal strength level. This correlation between segments and respective signal strength levels can continue such that an innermost segment 422 corresponds to a highest signal strength level. In operation, if a detected signal strength corresponds to the signal strength level, for example, of segment 428, then all segments corresponding to a signal strength level below or equal to the detected signal strength may be illuminated. Accordingly, segments 434, 432, 430, and 428 would be illuminated while segments 422, 424, and 426 would not be illuminated.

Thus, the microprocessor 110 of the radar detector 100 can determine, based on the detected radar signals, the correct control signals to activate the correct directional arrow (e.g., 420, 436, 438, or 440) based on a relative direction of the detected radar signal. Furthermore, based on a signal strength of the detected radar signal the appropriate segments (e.g., 422-434) of the directional arrow can be illuminated.

One of ordinary skill will recognize that the correspondence between signal strength and segments can be altered without departing from the intended scope of the present invention. For example, segment 422 may correspond to a lowest signal strength level and segment 434 can correspond to a highest signal strength level. In this alternative, a detected signal having a very low signal strength would result in only segment 422 being illuminated. Also, the segments can be aligned with the directional arrow as shown by the dotted lines in the directional arrow 436 in FIG. 4B.

Figure 4C:
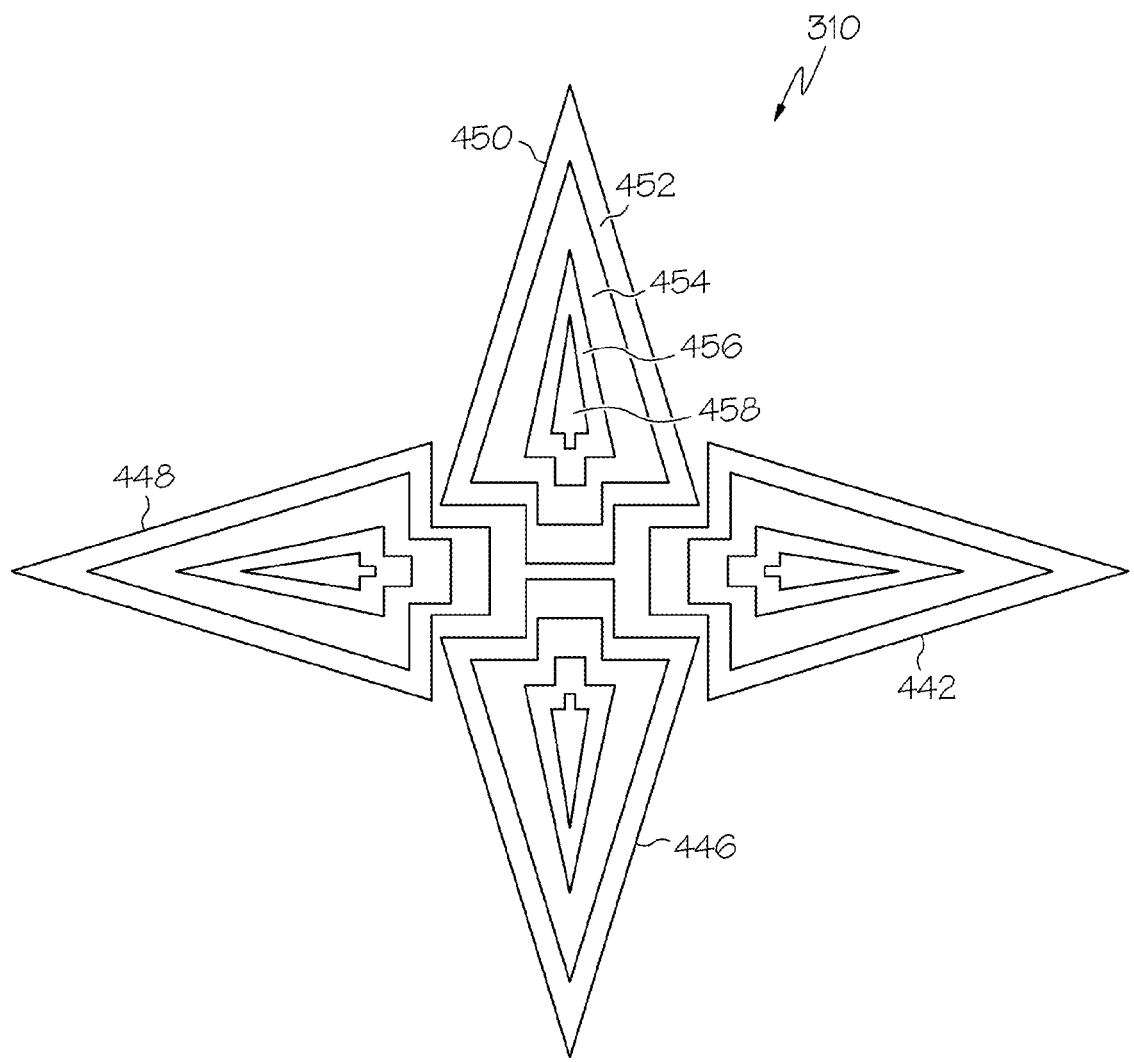

FIG. 4C is conceptually similar to the combined display portion of FIG. 4B. There are four directional arrows 442, 446, 448, and 450. Each such directional arrow is comprised of multiple, nested arrow segments such as, for example, arrow segments 458, 456, 454, and 452. In this example, the control signals from the microprocessor 110 will select the appropriate arrow segments of the appropriate directional arrow to illuminate. For example, if a relatively weak radar signal is detected from in front of the radar detector 100, then only arrow segment 458 may be illuminated. However, a relatively strong signal detected in front of the radar detector 100 may result in arrow segments 458, 456, 454, and 452 all being illuminated. Alternatively, in that instance, only illuminating arrow segment 452 may also convey a similar indication of both the strong signal strength and the signal direction to the user. Additionally, just the outline of the arrow segments 458, 456, 454, and 452, instead of their respective interior regions could be illuminated to provide concurrent display of signal strength and signal direction information.

Figure 4D:
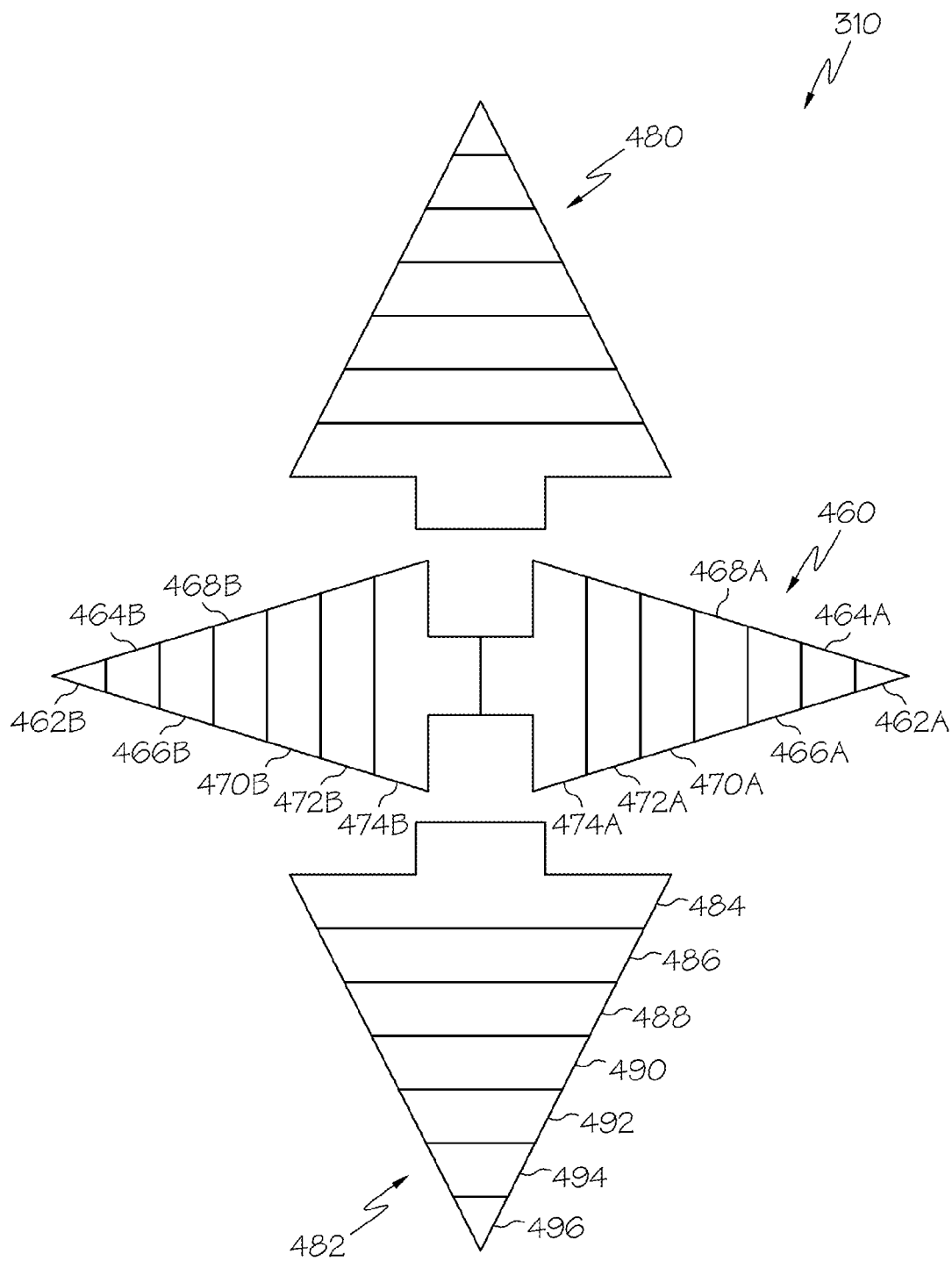

In some instances, it may be beneficial for a user to know that a detected radar signal is simply originating from one side or the other of the vehicle without necessarily knowing which particular side it is. In this instance, a combined display region 310, as shown in FIG. 4D can include a side visual indicator 460 that does not discriminate between the different sides of a vehicle. Thus, the combined display region 310 of FIG. 4D includes a side indicator 460, a front indicator 480, and a rear indicator 482. The front and rear indicators 480 and 482 are comprised of a number of different segments (e.g., 484-496). A similar indicator was described with respect to FIG. 4B, wherein the number of segments (e.g., 484-496) that are illuminated for a particular directional arrow reflect a signal strength level of a detected radar signal.

The side indicator 460, however, includes matched pairs of indicators segments. For example, a right segment 462A has a matching left segment 462B and another right segment 464A has a corresponding matching left segment 464B. Accordingly, the side indicator 460 includes right segments 462A-474A and respective matching left segments 462B-474B. When a detected radar signal is to one side or the other of the vehicle matching segments of the side indictor 460 are illuminated by the microprocessor 110 such that the particular segments (e.g., 462A-474A and 462B and 474B) which are active indicate a signal strength of the detected radar signal. For example, if a radar signal is detected to the right of the vehicle and has about a mid-level signal strength, then segments 468A, 468B, 470A, 470B, 472A, 472B, 474A, and 474B will be illuminated.

Figure 4E:
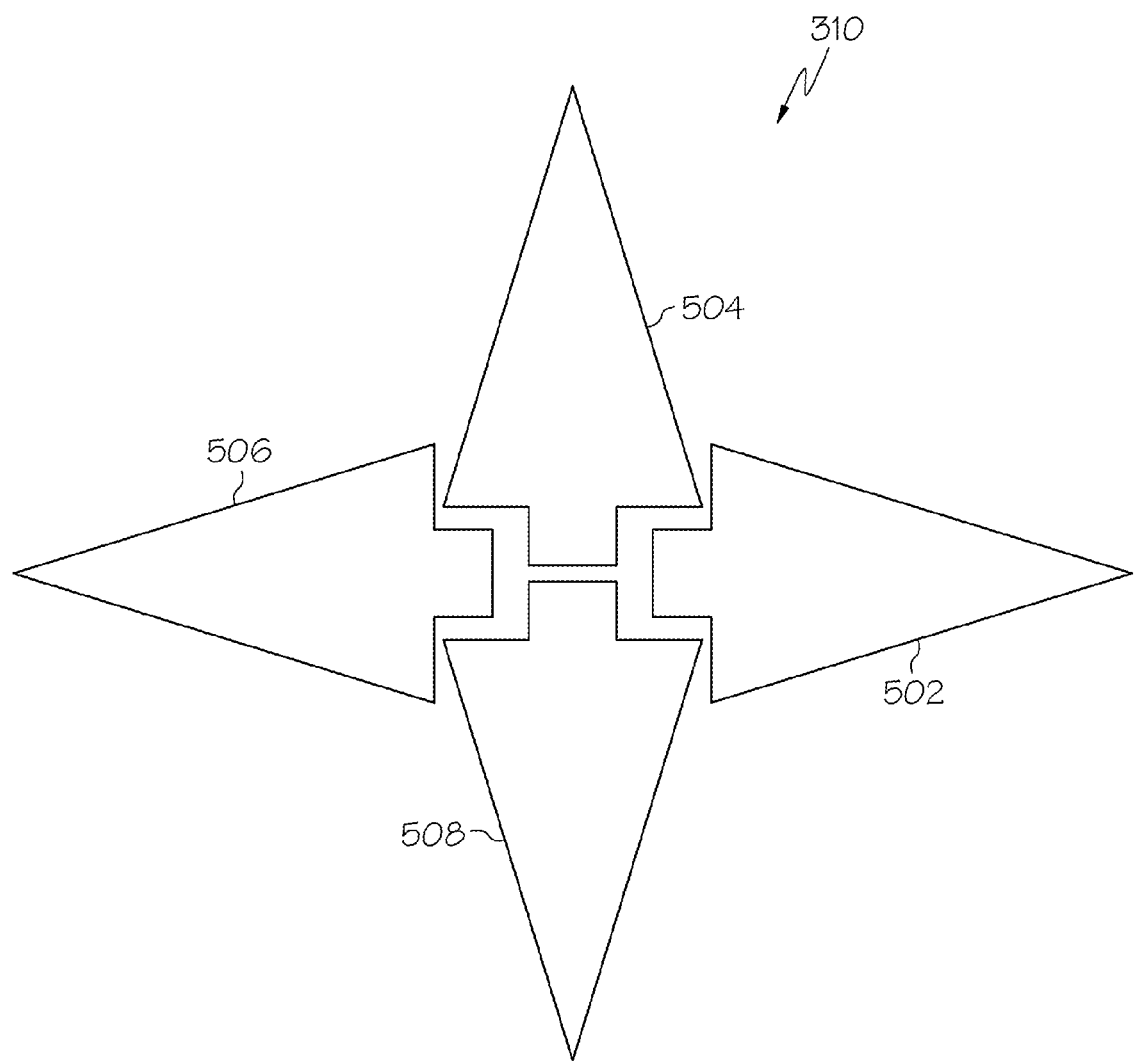

FIG. 4E depicts a combined display portion 310 in which there are four directional indicators 502, 504, 506, 508. In this example, the one directional indicator is illuminated, or made visible, by the microprocessor 110 that is indicative of the direction from which a detected radar signal originates. However, the directional indicators 502, 504, 506, 508 of FIG. 4E are multi-color visual elements and their color varies according to a signal strength of the detected radar signal. For example, the directional indicators 502, 504, 506, 508 may each be configured to be one of three colors (e.g., red, yellow, green) when activated. Based on the detected signal strength, the color of an activated directional indicator is controlled by the microprocessor 110 to indicate the signal strength. Thus, each directional indicator 502, 504, 506, and 508, when activated, provides a simultaneous visual indication of both the direction and strength of a detected radar signal.

In addition to, or instead of, different colors, the directional indicators 502, 504, 506, 508 of FIG. 4E may have a tint-level, or opacity, that varies according to a signal strength of the detected radar signal. For example, the directional indicators 502, 504, 506, 508 may each be configured so that if a) is faintly visible (or possibly comprise just an outline) when the detected signal strength is relatively low, b) is substantially opaque when the detected signal is near a maximum detectable strength level, and c) between the two extremes, has a tint level that varies between faintly visible to opaque depending on the detected signal strength. Thus, based on the detected signal strength, the tint-level, or opacity, of an activated directional indicator is controlled by the microprocessor 110 to indicate the signal strength. Accordingly, each directional indicator 502, 504, 506, and 508, when activated, provides a simultaneous visual indication of both the direction and strength of a detected radar signal.

Figure 4F:
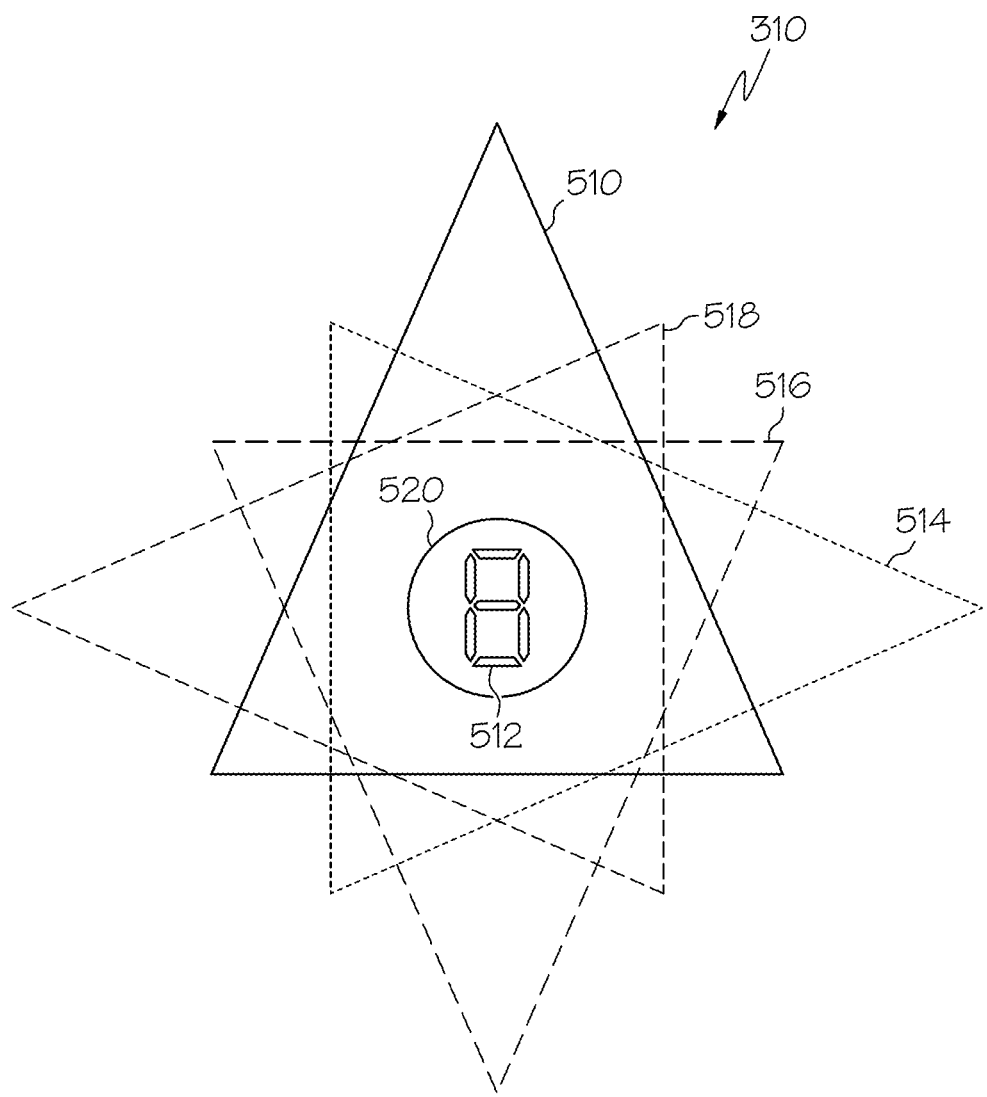

In the previous figures, for the sake of clarity, the different directional indicators were depicted such that they did not overlap one another. However, one of ordinary skill will recognize that various LED segments, LCD elements, lights, and display screens can be configured such that the indicator elements may overlap one another. For example, FIG. 4F depicts an example combined display region 310 in which there are four directional arrows 510, 514, 516, and 518 that at least partially overlap to create a common center portion 520. If the combined display region 310, for example, comprises a pixel-based display screen, then the outline of each of the arrows 510, 514, 516, and 518 encompasses the pixels that would be illuminated when one of those arrows were activated by the microprocessor 110. In addition to the arrows 510, 514, 516, and 518, the combined display region 310 also includes a visual indicator 512 that provides an indication of the signal strength of a detected radar signal. The visual indicator 512 is depicted in FIG. 4F as a 7-segment display located in the common center portion 520 but a bar graph or similar signal strength indicator could be utilized as well. In operation, one of the arrows 510, 514, 516, and 518 is activated to indicate a direction from which a detected radar signal originates and the 7-segment display 512 displays a value that is indicative of the signal strength of that detected radar signal.

Figure 5A:
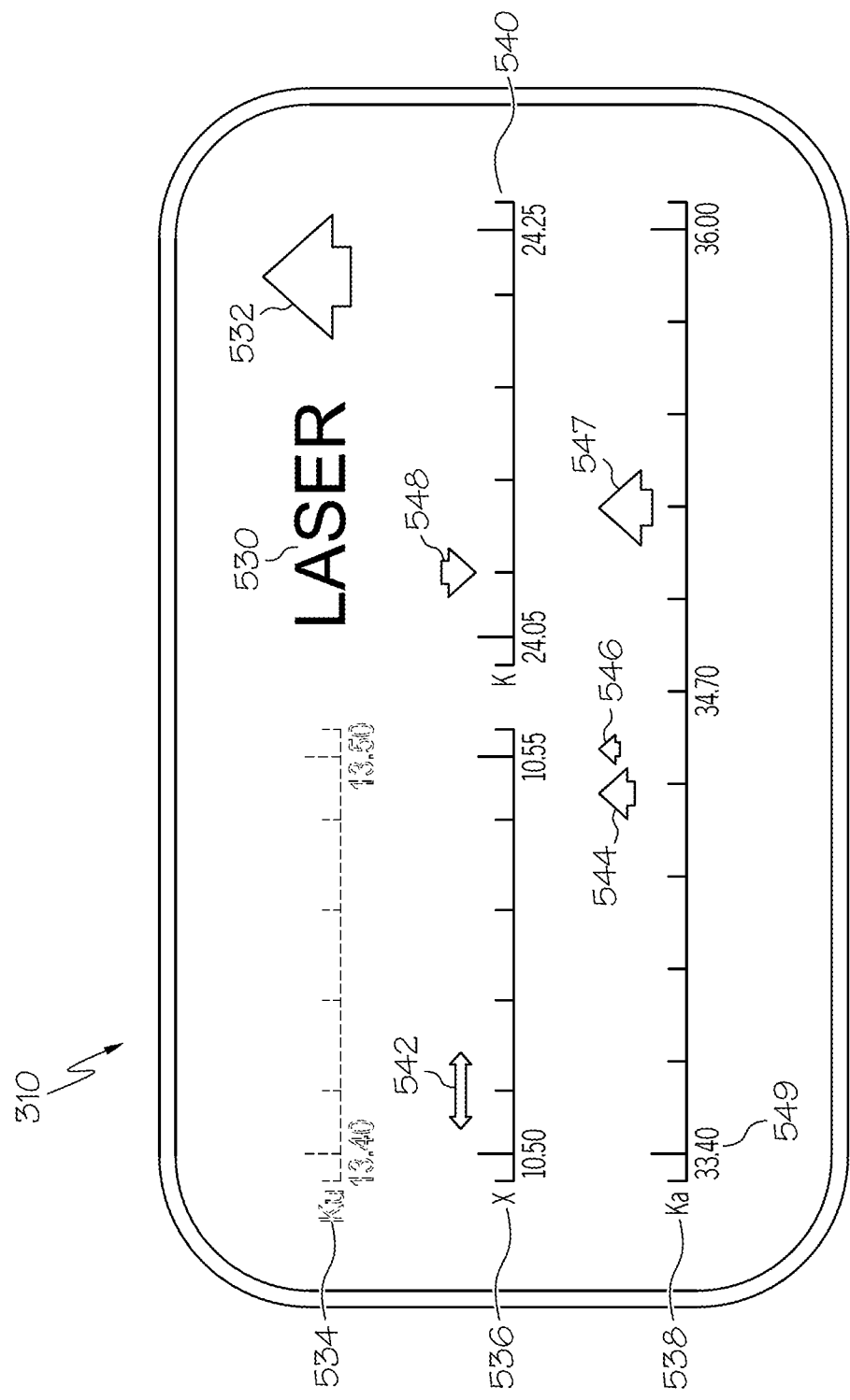
FIGS. 5A and 5B depict different concurrent displays of one or more signal strength indicators and signal direction indicators in a single portion of a display in accordance with the principles of the present invention.
Figure 5B:
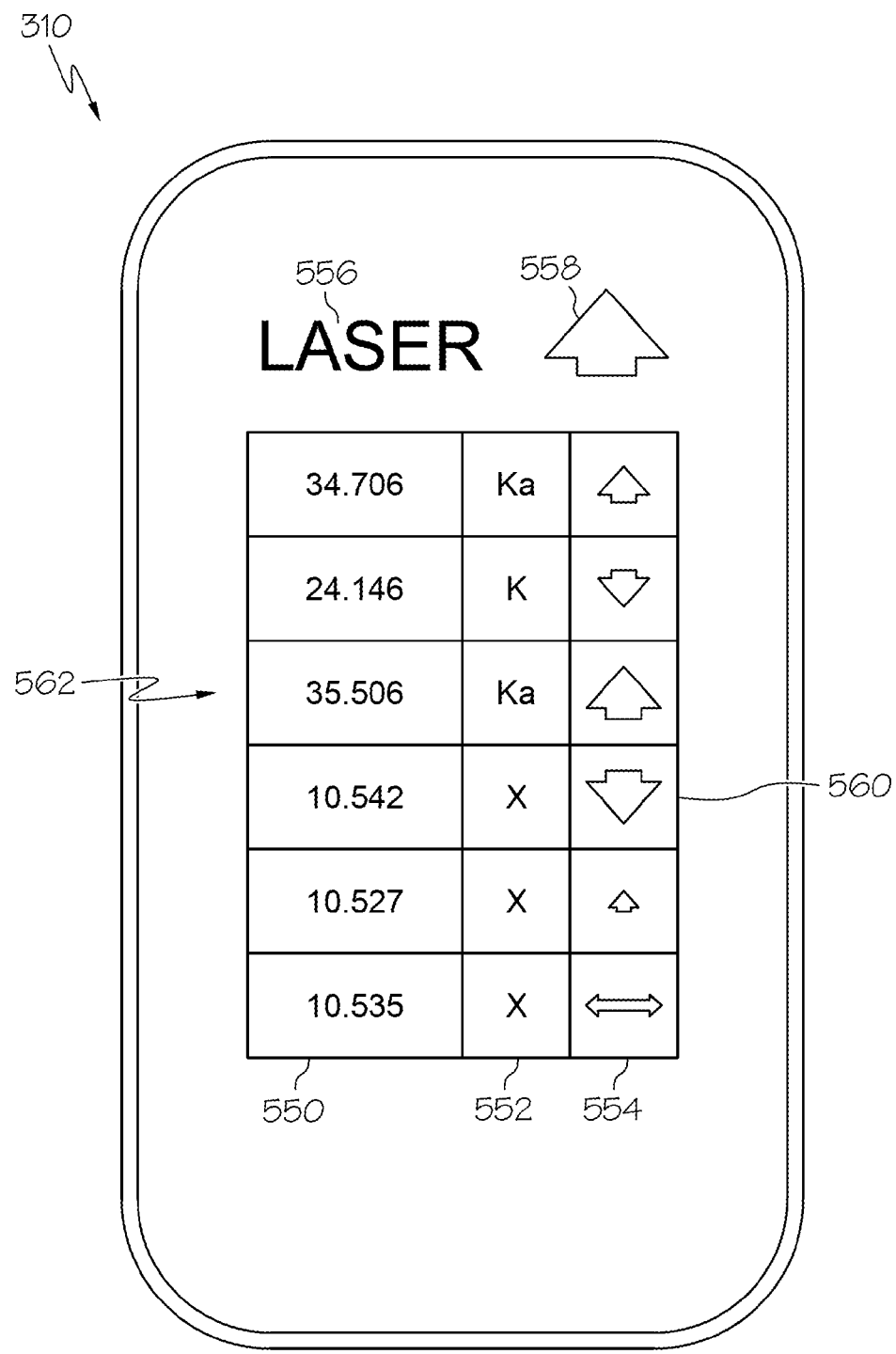

In some instances, there may be more than one detected radar signal present. FIG. 5A and FIG. 5B depict at least some examples of how the respective signal strength and signal direction of each of such multiple detected signals can be concurrently displayed.

In FIG. 5A, the combined display region 310 has a separate display portion for each radar band. The Ku band has a display scale 534, the X band has its display scale 536, the Ka band has its display scale 538 and the K band has its own display scale 540. Each of these display scales can have a respective legend (e.g., 549) that allows an operator to identify the frequencies associated with a particular radar band display scale. One or more of the bands may be disabled by the operator in which case the display scale and legend may be removed from the display. For example, in FIG. 5A, if the Ku band is disabled, its display scale 534 and legend may be removed from the display region 310 as indicated by showing the display scale 534 and its legend in dotted lines.

The combined display region 310 also has a portion that can highlight a particular band or signal type that is a priority as determined by the operator or by the radar detector. For example, in FIG. 5A, an indicator 530 reveals that a laser signal has been detected and an arrow icon 532 (e.g., by its size) indicates that the laser signal is relatively strong and (e.g., by its pointing direction) indicates that the laser signal is originating from the front of the vehicle.

In the combined display region 310 of FIG. 5A, there are no radar signals detected in the Ku band and so no icons are displayed that are associated with the display scale 534. However, there is one signal detected in the X band and, thus, a double headed arrow icon 542 showing signal strength and signal direction is displayed. The double headed icon 542 is located at a position of the display scale 536 that corresponds to its frequency within the X band. In particular, the icon 542 reveals that a radar signal of moderate strength was detected that originated from one side of the vehicle and that its frequency is about 10.51 GHz.

There was also one radar signal detected in the K band. The arrow icon 548 reveals that this radar signal is of moderate strength, originates from behind the vehicle and has a frequency of about 24.09 GHz. In the Ka band, there were three radar signals detected. The arrow icons 544, 546, 547 reveal that all three radar signals originated from in front of the vehicle and that a moderate strength signal was detected at about 34.64 GHz, a weak signal was detected at about 34.67 GHz, and a strong signal was detected at about 35.35 GHz.

FIG. 5B depicts a combined display region 310 in which the signal direction and signal strength of a plurality of different detected radar signals can be presented in a tabular format. A priority region can be included that indicates a signal type indicator 556 and signal direction and strength arrow icon 558 of a detected radar signal that is considered a priority as determined by the operator or by the radar detector. In particular, the size and direction of the arrow icon 558 in FIG. 5B can indicate that a strong laser signal was detected originating from in front of the vehicle.

A tabular region 562 of the display 310 can include multiple columns 550, 552, 554 and multiple rows. One example, row 560, is labeled in FIG. 5B. Each row of the tabular region 562 is associated with one of a plurality of detected radar signals and may include three columns of data. One column 550 may indicate a frequency of the detected radar signal while a second column 552 can indicate the particular radar band associated with that frequency. A third column 554 can provide an icon or indicator that concurrently indicates both a signal direction and signal strength associated with the detected radar signal. In this way, the operator can be visually presented with information about a plurality of different radar signals and easily determine, for each radar signal, its relative signal strength and originating direction as well as its frequency and band information.

Thus, as shown in FIGS. 5A and 5B, once the radar signal detector determines a signal strength of a police radar signal and a direction of a source of the police radar signal, the display portion can display an icon having a visual appearance which varies based on both the direction and on the signal strength. For example, the icon can have the appearance of an arrow, single headed or double headed, with its size varying based on the determined signal strength, and its pointing direction varying based on the direction of the source of the police radar signal.

Figure 6A:
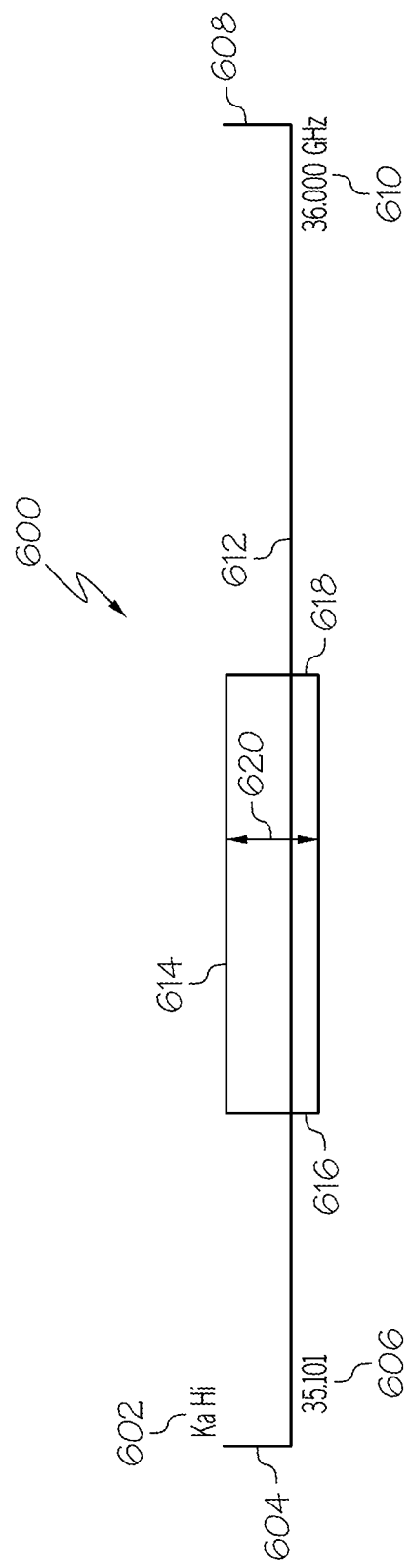
FIGS. 6A and 6B depict additional concurrent displays of one or more signal strength indicators and signal direction indicators in a single portion of a display in accordance with the principles of the present invention.

FIG. 6A includes an additional configuration of a display 600 for visually presenting one or more signal strength and signal direction indicators for a particular radar band. A label 602 can be included in the display 600 to identify the particular radar band (e.g., "Ka-Hi", "X", "Ku", etc.) The display 600 includes a frequency band display bar 612 wherein a location along the horizontal length of the bar 612 is representative of a particular frequency. For example, a left end 604 of the bar 612 can correspond to a frequency 606 such as 35.101 GHz and a right end 608 of the bar 612 can correspond to a different frequency 610 such as 36.000 GHz. Thus, a position along the bar 612 represents a specific frequency between those two end frequencies 606, 610.

In addition to the display elements described above, the display 600 can include a box 614 that is positioned between the two ends 604, 608 of the display bar 612. The box 614 extends in the horizontal direction from a left end 616 to a right end 618. Thus, the box 614 extends over a sub-range of the frequencies that are represented by the entire display bar 612. In particular, the positions of the right end 618 and left end 616 of the box 614 may be selected to coincide with frequencies known to be associated with one or more radar guns used by law enforcement personnel.

If a signal is detected in any of the frequencies represented by the display bar 612, then an alarm or alert can be triggered thereby alerting a user of the radar detector of the possible presence of a radar gun in operation. However, whether the detected signal is outside of the frequency sub-range represented by the box 614 or is inside that frequency sub-range constitutes additional information that may be helpful to the user for determining how to react to the alarm or alert.

As shown in FIG. 6A, the box 614 also extends in a vertical direction for a height 620. The height 620 may be arbitrarily chosen based on the desired aesthetics of the display 600 and/or based on additional information which may also be visually included in the display 600. The height 620 may be used to allow a user to gauge a strength associated with a detected radar signal. As discussed later with respect to FIG. 6B, a visual indicator, an arrow, or other display icon may be displayed in the box 614 (or any other location along the display bar 612). When displaying that indicator or icon, for example, its size can extend the full height 620 or just a portion of the height 620 depending on a corresponding signal strength that was detected. A larger icon or indicator can be used to represent a larger detected signal strength value.

Figure 6B:
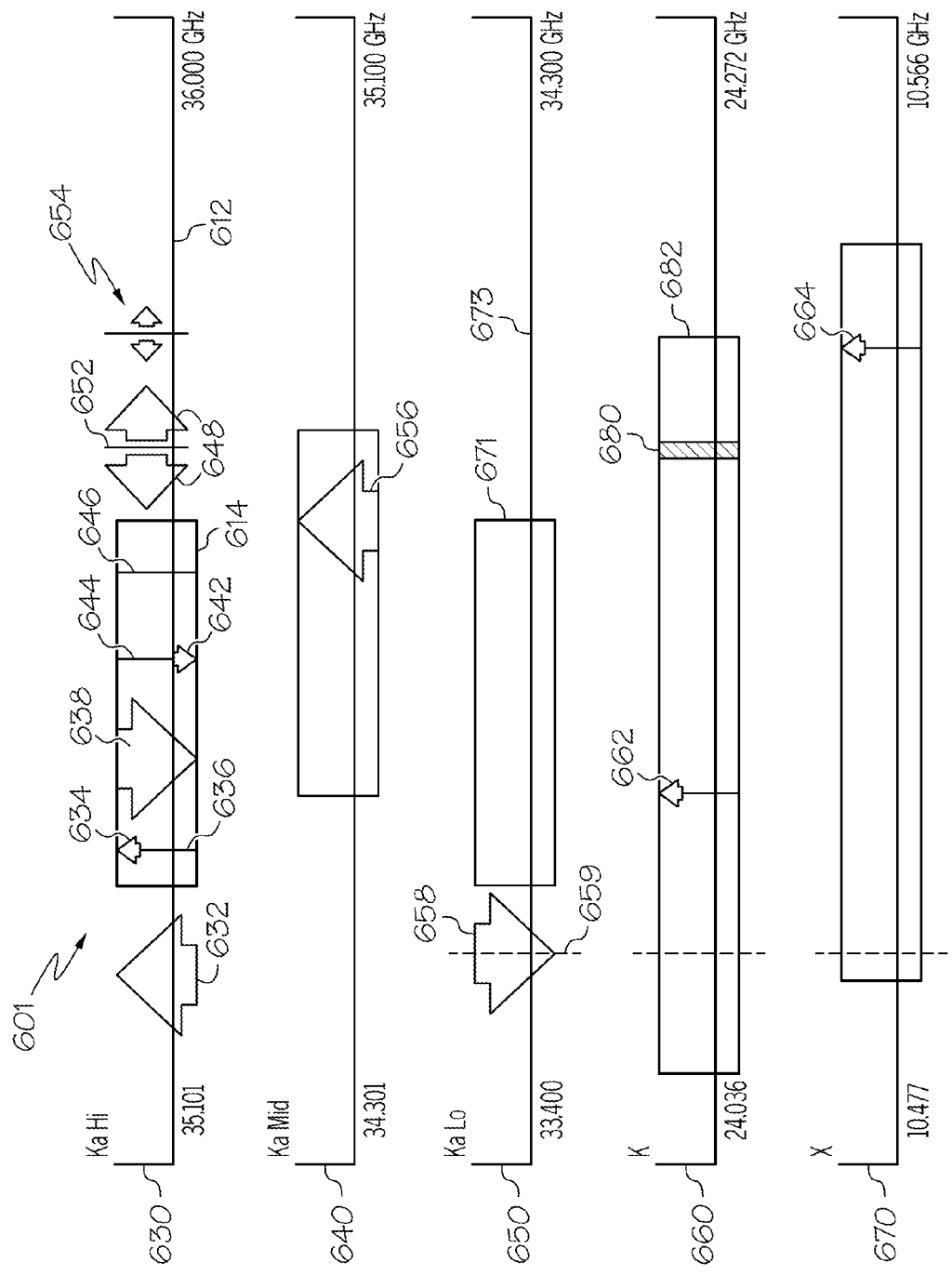

FIG. 6B depicts one example display 601 that includes five different display portions 630, 640, 650, 660, 670 that each correspond to a respective radar band. Each display portion 630, 640, 650, 660, 670 may be similar in appearance and function as the display 600 of FIG. 6A. The display 601 allows a user to be visually presented with information from a number of radar bands simultaneously. One of ordinary skill will recognize that not all of the five radar bands must necessarily be displayed at once. For example, the user can select the number of bands for concurrent display and then specify which bands correspond to each display position. Alternatively, the bands can vertically scroll so that the user is provided with information from one or two bands concurrently but is eventually provided with information from all the different radar bands as the display scrolls through all the bands. Another example configuration may include only displaying those radar bands in which there is a radar signal currently being detected. Thus, if no radar signal is being detected in a particular band, that band would not be displayed to the user.

As an example, a radar detector may detect radar signals as having one of eight different discrete strength levels. However, fewer discrete levels or more discrete levels than just eight may be used without departing from the scope of the present invention. In addition to signal strength, the radar detector, as described above, may also detect a direction from which a detected radar signal is originating. Referring now to FIG. 6B, a display portion 630 of the display 601 can be described with example symbols and icons used to convey to a user information about one or more radar signals being detected.

Within the band of frequencies associated with the frequency band display bar 612, a detected signal having a lowest frequency results in an indicator 632 being displayed within the display portion 630. The indicator 632 may, for example, be an arrow that points in a direction that indicates the direction from which that detected radar signal originates. A size of the arrow 632 can, for example, be the same as the height 620 of the box 614 so as to indicate that this detected signal is being detected at the highest signal strength level (e.g., signal strength level "8"). However, the frequency of this signal is outside of the box 614 and, therefore, may not correspond to a frequency in which radar guns are known to, or allowed to, operate.

A second signal may be detected at a next-higher frequency and result in another visual alarm indicator comprised of an arrow 634 and a vertical line 636. The arrow 634 may indicate a direction from which this second signal originated and its size may be the smallest possible arrow that is displayed so as to indicate that the second signal is being detected at the lowest possible signal strength level (e.g., level "1"). The vertical line 636 extends down to the bottom of the box 614 to help indicate a frequency position at which the second signal is being detected.

A third signal of the highest strength level and originating from behind the detector may be detected at a next-higher frequency as compared to the second signal. The indicator 638 may thus be used to alert the user of detection of this third signal. A fourth signal, also originating from behind the detector, but having a weaker signal strength can result in an indicator comprised of an arrow 642 and a vertical line 644. In this instance, the vertical line 644 extends upward so as to cross the frequency band display bar 612 to help the user identify the frequency at which the fourth signal is detected.

A fifth detected signal results in an indicator 646 (e.g., a vertical line) being displayed at the appropriate location along the frequency band display bar 612. For example, the fifth signal may be detected for a period of time that exceeds some predetermined threshold. Signals that exceed that predetermined period threshold may be more unlikely to be the result of a radar gun whose signals are detected only for a relatively short period of time that the detector is within the operating range of the radar gun. Thus, this persistent signal may still cause an indicator to be displayed but differ in appearance from other indicators (e.g., 632) so that the user can be informed of this signal's characteristics.

There may be a sixth and seventh radar signal detected within the radar band represented by the display bar 612. The sixth signal may, for example, result in display of an indicator comprising two arrows 648 and a vertical line 652. The size of the arrows 648 may relate to the strength of the sixth detected signal, the orientation of the arrows 648 may indicate that the sixth detected signal originated from one side of the detector, and the vertical line 652 may indicate a frequency at which the sixth detected signal is occurring. The indicator 654 is similar and may correspond to the seventh detected signal that also originates from one side of the detector but at a signal strength weaker than the sixth detected signal.

The second, third, fourth, and fifth detected signals may be of more interest to a user than the first, sixth and seventh signals. Because the position along the frequency band display bar 612 of the first, sixth, and seventh signals places theft respective frequencies (and alert indicators) outside of the box 614, these signal may be more unlikely to correspond to an actual radar gun in use by law enforcement personnel.

As discussed above, there may be other display portions 640, 650, 660, 670 that can be concurrently displayed within the display 601. Each of these display portions may have their own respective indicators 656, 658, 662, 664 that alert the user to signals detected within the respective frequency bands.

The indicator 658 may, for example, have a height that extends the same as a height of a box 671. Thus, there may not be room to display a vertical line such as the lines 636, 644. A line 659 (shown as a dotted line in FIG. 6B within the indicator 658) may be displayed, however, that extends through the indicator 658 such that the line 659 crosses a frequency band display bar 673 at a point corresponding to a particular frequency. The line 659 may not necessarily extend the full height of the indicator 658 but may, alternatively, extend from one end of the indicator 658 towards the frequency band display bar 673 and end when the line 659 intersects the frequency band display bar 673.

One of ordinary skill will recognize that the particular symbols, icons or indicators used within the display portions 630, 640, 650, 660, 670 are not limited to the example arrows described above with respect to FIG. 1 through FIG. 6A. Additionally, the visual display of a box 614 or other boundary that, as described above, indicates a particular sub-range of frequencies of interest within a larger frequency scanning band may be utilized without including arrows or indicators having variable sizes, shapes, or orientations.

For example, a vertical bar 680 as shown in display portion 660 of FIG. 6B may be used to indicate a detected signal regardless of that signal's strength or the direction from which it originated. The presence of the indicator 680 within the box 682 rather than outside the box 682 provides information to a user of the detector in addition to merely the presence of that detected signal. The position of the indicator 680 relative to the box 682 allows the user to determine whether the detected signal is more or less likely to be originating from a radar gun being operated by law enforcement personnel.

The box 614 of FIGS. 6A and 6B is merely one example of how to display an indicator in a manner so as to convey that its associated detected signal has a frequency occurring within a predetermined sub-range of frequencies of interest. For example, referring to FIG. 6B, the arrows 632 and 648 may be displayed in a subdued color as compared to a color used to display arrows 634, 638, and 642. Thus, the outline of box 614 may not be visible and yet the user, based on the color of an indicator, can determine if that indicator is "within" the box. Thus, for a display portion corresponding to a radar band, the box 614 described above is more generally considered to be a sub-section of that display portion wherein an appearance of an indicator within the sub-section can be visually distinguishable from an appearance of another indicator outside the sub-section. In some instances, it may be the presence of a box or similar structure that conveys such visual distinction or, in other instances, a color (e.g. foreground or background) of indicators within that sub-section may convey the distinction.

In the above description, the example directional indicators were used to provide a visual indication to a driver of the direction of a source of the detected radar signal such as "in front of the vehicle", "to the side of the vehicle", and "to the rear of the vehicle". However, as described more fully in the incorporated patent, U.S. Pat. No. 5,151,701, the relative direction of the source of the detected radar signal can be determined with a much finer granularity. For example, 8, 10 or 12 directional arrows (instead of just 4) could be provided to indicate the direction from which a detected radar signal originates.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus comprising:
   a radar signal detector configured to detect a police radar signal and determine a frequency of the police radar signal;
   a display in communication with the radar signal detector and configured to provide a first display portion associated with a first range of frequencies; and
   the display further configured to provide a visual indicator associated with the police radar signal, the visual indicator having a first position within the first display portion which varies based on the frequency of the police radar signal and the visual indicator having a first visual appearance when the frequency is within a predetermined subset of the first range of frequencies and a second visual appearance when the frequency is outside the predetermined subset of the first range of frequencies;
   wherein the display is configured to provide a frequency-band display bar having a first end corresponding to a starting frequency of the first range of frequencies and a second end corresponding to an ending frequency of the first range of frequencies, and wherein the visual indicator is located at the first position, along the frequency-band display bar between the first end and the second end, corresponding to the frequency of the police radar signal.

2. The apparatus of claim 1, wherein:
   the display is configured to provide a box positioned over at least a section of the frequency-band display bar such that a first side of the box is located at a second position, along the frequency-band display bar corresponding to a starting frequency of the predetermined subset of the first range of frequencies, and a second side of the box, opposite the first side, is located at a third position, along the frequency-band display bar corresponding to an ending frequency of the predetermined subset of the first range of frequencies; and
   when the frequency is within the predetermined subset of the first range of frequencies the first visual appearance of the visual indicator comprises the visual indicator being located within the box, and when the frequency is outside the predetermined subset of the first range of frequencies the second visual appearance comprises the visual indicator being located outside the box.

3. The apparatus of claim 2, wherein the radar signal detector is further configured to determine a signal strength of the police radar signal and a direction of a source of the police radar signal.

4. The apparatus of claim 3, wherein the visual indicator is further configured to have a variable visual appearance which varies based on the signal strength.

5. The apparatus of claim 4, wherein a size of the visual indicator varies based on the signal strength.

6. The apparatus of claim 3, wherein the visual indicator is further configured to have a variable visual appearance which varies based on the direction of the source of the police radar signal.

7. The apparatus of claim 6, wherein the visual indicator comprises an arrow and a pointing direction of the arrow is substantially towards the direction of the source of the police radar signal.

8. The apparatus of claim 1, wherein:
when the frequency is within the predetermined subset of the first range of frequencies, the first visual appearance of the visual indicator comprises the visual indicator having a first color, and when the frequency is outside the predetermined subset of the first range of frequencies the second visual appearance comprises the visual indicator having a second color different than the first color.

9. The apparatus of claim 1, wherein:
when the frequency is within the predetermined subset of the first range of frequencies the first visual appearance of the visual indicator comprises the visual indicator having a first background color, and when the frequency is outside the predetermined subset of the first range of frequencies the second visual appearance comprises the visual indicator having a second background color different than the first background color.

10. The apparatus of claim 1, wherein the visual indicator comprises:
an arrow having a pointing end and a base end; and
a line extending from the base end, perpendicular to the frequency-band display bar and passing through the frequency-band display bar at the first position.

11. The apparatus of claim 1, wherein:
the display is further configured to provide, concurrently with the first display portion, a second display portion associated with a second range of frequencies.

12. A method for displaying information about a detected radar signal, comprising:
determining a frequency of a detected radar signal;
displaying a first display portion associated with a first range of frequencies;
displaying a visual indicator associated with the police radar signal, the visual indicator having a first position within the first display portion which varies based on the frequency of the police radar signal and the visual indicator having a first visual appearance when the frequency is within a predetermined subset of the first range of frequencies and a second visual appearance when the frequency is outside the predetermined subset of the first range of frequencies; and
displaying a frequency-band display bar having a first end corresponding to a starting frequency of the first range of frequencies and a second end corresponding to an ending frequency of the first range of frequencies, and wherein the visual indicator is located at the first position, along the frequency-band display bar between the first end and the second end, corresponding to the frequency of the police radar signal.

13. The method of claim 12, further comprising:
displaying a box positioned over at least a section of the frequency-band display bar such that a first side of the box is located at second position, along the frequency-band display bar corresponding to a starting frequency of the predetermined subset of the first range of frequencies, and a second side of the box, opposite the first side, is located at a third position, along the frequency-band display bar corresponding to an ending frequency of the predetermined subset of the first range of frequencies; and
displaying the visual indicator further comprises:
when the frequency is within the predetermined subset of the first range of frequencies, displaying the visual indicator within the box, and
when the frequency is outside the predetermined subset of the first range of frequencies, displaying the visual indicator outside the box.

14. The method of claim 13, comprising:
determining a signal strength of the detected radar signal; and
determining a direction of a source of the detected radar signal.

15. The method of claim 14, wherein the visual indicator is further configured to have a variable visual appearance which varies based on the signal strength.

16. The method of claim 15, wherein a size of the visual indicator varies based on the signal strength.

17. The method of claim 14, wherein the visual indicator is further configured to have a variable visual appearance which varies based on the direction of the source of the police radar signal.

18. The method of claim 17, wherein the visual indicator comprises an arrow and a pointing direction of the arrow is substantially towards the direction of the source of the police radar signal.

19. The method of claim 12, wherein:
displaying the visual indicator further comprises:
when the frequency is within the predetermined subset of the first range of frequencies, displaying the visual indicator with a first color, and
when the frequency is outside the predetermined subset of the first range of frequencies, displaying the visual indicator with a second color different than the first color.

20. The method of claim 12, wherein:
displaying the visual indicator further comprises:
when the frequency is within the predetermined subset of the first range of frequencies, displaying the visual indicator with a first background color, and
when the frequency is outside the predetermined subset of the first range of frequencies, displaying the visual indicator with a second background color different than the first background color.

21. The method of claim 12, wherein the visual indicator comprises:
an arrow having a pointing end and a base end; and
a line extending from the base end, perpendicular to the frequency-band display bar and passing through the frequency-band display bar at the first position.

22. The method of claim 12, comprising:
displaying, concurrently with the first display portion, a second display portion associated with a second range of frequencies.

23. An apparatus comprising:
a radar signal detector configured to detect a police radar signal and determine a frequency of the police radar signal;
a display in communication with the radar signal detector and configured to provide a first display portion associated with a range of frequencies;
the display further configured to provide a frequency-band display bar having a first end corresponding to a starting frequency of the range of frequencies and a second end corresponding to an ending frequency of the range of frequencies;

the display further configured to provide a box positioned over at least a section of the frequency-band display bar such that a first side of the box is located at a first position, along the frequency-band display bar corresponding to a starting frequency of a predetermined subset of the range of frequencies and a second side of the box, opposite the first side, is located at a second position, along the frequency-band display bar corresponding to an ending frequency of the predetermined subset of the range of frequencies; and the display further configured to provide a visual indicator associated with the police radar signal, located at a position, along the frequency-band display bar between the first end and the second end, corresponding to the frequency of the police radar signal such that when the frequency is within the predetermined subset of the range of frequencies the position of the visual indicator is located within the box, and when the frequency is outside the predetermined subset of the range of frequencies the position of the visual indicator is located outside the box.

\* \* \* \* \*